United States Patent
Ye et al.

(10) Patent No.: US 9,143,044 B2
(45) Date of Patent: Sep. 22, 2015

(54) APPARATUS AND METHOD FOR PULSE WIDTH MODULATION CONTROL FOR SWITCHING POWER CONVERTERS

(75) Inventors: Liming Ye, Frisco, TX (US); Xujun Liu, Shenzhen (CN)

(73) Assignee: Futurewei Technologies, Inc., Plano, TX (US)

( * ) Notice: Subject to any disclaimer, the term of this patent is extended or adjusted under 35 U.S.C. 154(b) by 358 days.

(21) Appl. No.: 13/614,933

(22) Filed: Sep. 13, 2012

(65) Prior Publication Data

US 2013/0063185 A1 Mar. 14, 2013

Related U.S. Application Data

(60) Provisional application No. 61/534,233, filed on Sep. 13, 2011.

(51) Int. Cl.
*H02M 3/335* (2006.01)
*H02M 1/088* (2006.01)
*H02M 1/00* (2007.01)

(52) U.S. Cl.
CPC ...... *H02M 3/33569* (2013.01); *H02M 3/33538* (2013.01); *H02M 1/088* (2013.01); *H02M 2001/0058* (2013.01); *Y02B 70/1491* (2013.01)

(58) Field of Classification Search
CPC ............... H02M 2001/0058; H02M 1/083; H02M 1/088; H02M 3/33538; H02M 3/33546; H02M 3/33553; H02M 3/33569

USPC ............... 363/15, 21.04, 21.06, 21.1, 21.11, 363/56.04; 323/288
See application file for complete search history.

(56) References Cited

U.S. PATENT DOCUMENTS

| | | | |
|---|---|---|---|
| 8,009,448 B2 * | 8/2011 | Liu | 363/56.12 |
| 2002/0001210 A1 * | 1/2002 | Kuranuki et al. | 363/98 |
| 2005/0146311 A1 * | 7/2005 | Kuo et al. | 323/282 |
| 2005/0280404 A1 * | 12/2005 | LeFevre | 323/282 |
| 2010/0020569 A1 * | 1/2010 | Melanson et al. | 363/21.03 |
| 2011/0149607 A1 * | 6/2011 | Jungreis et al. | 363/21.02 |
| 2011/0291624 A1 * | 12/2011 | Cho et al. | 323/271 |
| 2012/0033456 A1 * | 2/2012 | Koike et al. | 363/21.04 |
| 2012/0256671 A1 * | 10/2012 | Xu et al. | 327/175 |
| 2012/0287680 A1 * | 11/2012 | Luo et al. | 363/21.02 |
| 2012/0287681 A1 * | 11/2012 | Wahledow et al. | 363/21.04 |
| 2013/0033248 A1 * | 2/2013 | Granger | 323/288 |

* cited by examiner

*Primary Examiner* — Fred E Finch, III
(74) *Attorney, Agent, or Firm* — Slater & Matsil, L.L.P.

(57) ABSTRACT

An embodiment apparatus comprises a first two-piecewise linear approximation generator and a second two-piecewise linear approximation generator coupled to an output of the first two-piece wise linear approximation generator. The second two-piecewise linear approximation generator generates a dead time inversely proportional to the output of the first two-piece wise linear approximation generator. A gate drive generator is configured to generate a primary switch drive signal and an auxiliary switch drive signal complementary to the primary switch drive signal. In addition, the dead time between the primary switch drive signal and the auxiliary switch drive signal is adjustable when the power converter operates in a light load condition.

20 Claims, 5 Drawing Sheets

APPARATUS AND METHOD FOR PULSE WIDTH MODULATION CONTROL FOR SWITCHING POWER CONVERTERS

This application claims the benefit of U.S. Provisional Application No. 61/534,233, filed on Sep. 13, 2011, entitled "Apparatus and Method for Pulse Width Modulation Control for Power Converters," which application is hereby incorporated herein by reference.

TECHNICAL FIELD

The present invention relates to an apparatus and method for pulse width modulation (PWM) control, and, in particular embodiments, to an adaptive dead time control apparatus and method for isolated switching power converters.

BACKGROUND

A telecommunication network power system usually includes an ac-dc stage converting the power from the ac utility line to a 48V dc distribution bus and a dc/dc stage converting the 48V dc distribution bus to a plurality of voltage levels for all types of telecommunication loads. A conventional ac-dc stage may comprise a variety of EMI filters, a bridge rectifier formed by four diodes, a power factor correction circuit and an isolated dc/dc power converter. The dc/dc stage may comprise a plurality of isolated dc/dc converters. Isolated dc/dc converters can be implemented by using different power topologies, such as LLC resonant converters, flyback converters, forward converters, half bridge converters, full bridge converters and the like.

Active clamp forward converters are widely adopted for small to medium power level isolated power converters in the telecommunications and data communications industries. Higher light-load efficiency is increasingly demanded in small and medium power level isolated power converters. Under a light load condition, adaptive dead time control helps to achieve zero voltage switching (ZVS) on the main switch and increase light load efficiency.

SUMMARY OF THE INVENTION

These and other problems are generally solved or circumvented, and technical advantages are generally achieved, by preferred embodiments of the present invention which provide an adaptive dead time control apparatus and method of a primary side pulse width modulation (PWM) controller in an isolated power converter.

In accordance with an embodiment, an apparatus comprises a first two-piecewise linear approximation generator comprising a light load ramp generator and a clamping voltage generator, wherein a ramp generated by the light load ramp generator is clamped by a clamping voltage generated by the clamping voltage generator. The apparatus further comprises a second two-piecewise linear approximation generator coupled to an output of the first two-piecewise linear approximation generator, wherein the second two-piecewise linear approximation generator generates a dead time inversely proportional to the output of the first two-piecewise linear approximation generator and a gate drive generator configured to generate a primary switch drive signal and an auxiliary switch drive signal complementary to the primary switch drive signal, wherein the dead time is placed between the primary switch drive signal and the auxiliary switch drive signal.

In accordance with another embodiment, a system comprises a primary switching circuit and a primary side pulse width modulation controller. The primary switching circuit comprises a main switch and an auxiliary switch, wherein a main switch gate drive signal is complementary to an auxiliary switch gate drive signal.

The primary side pulse width modulation controller comprises a current sense unit, an input voltage sense unit, a first two-piecewise linear approximation generator having a first input coupled to the current sense unit and a second input coupled to the input voltage sense unit and a second two-piecewise linear approximation generator coupled to an output of the first two-piecewise linear approximation generator, wherein the second two-piecewise linear approximation generator generates a dead time inversely proportional to the output of the first two-piecewise linear approximation generator. The primary side pulse width modulation controller further comprises a gate drive generator configured to generate a primary switch drive signal and an auxiliary switch drive signal complementary to the primary switch drive signal, wherein the dead time is placed between the primary switch drive signal and the auxiliary switch drive signal.

In accordance with yet another embodiment, a method comprises detecting a load current of a power converter, detecting an input voltage of the power converter, generating a first voltage signal based upon the load current and the input voltage using a first two-piecewise linear approximation curve, generating a second voltage signal based upon the first voltage signal using a second two-piecewise linear approximation curve, wherein the second voltage signal is inversely proportional to the first voltage signal and generating a dead time between a primary switch of the power converter and auxiliary switch of the power converter using the second voltage signal.

An advantage of an embodiment of the present invention is an adaptive dead time control apparatus and method helps to reduce the switching losses so as to increase the efficiency of an isolated dc/dc converter. The efficiency improvement occurs in various load conditions including light load, medium load and heavy load conditions.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures or processes for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawings, in which.

Corresponding numerals and symbols in the different figures generally refer to corresponding parts unless otherwise indicated. The figures are drawn to clearly illustrate the relevant aspects of the various embodiments and are not necessarily drawn to scale.

DETAILED DESCRIPTION OF ILLUSTRATIVE EMBODIMENTS

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

The present invention will be described with respect to preferred embodiments in a specific context, namely a primary side dead time control apparatus and method of an active clamp forward converter. The invention may also be applied, however, to a variety of isolated dc/dc power converters including half bridge converters, full bridge converters, flyback converters, forward converters, push-pull converters and the like. Furthermore, the invention may also be applied to a variety of non-isolated power converters such as buck switching converters, boost switching converters, buck-boost switching converters and the like.

Figure 1:
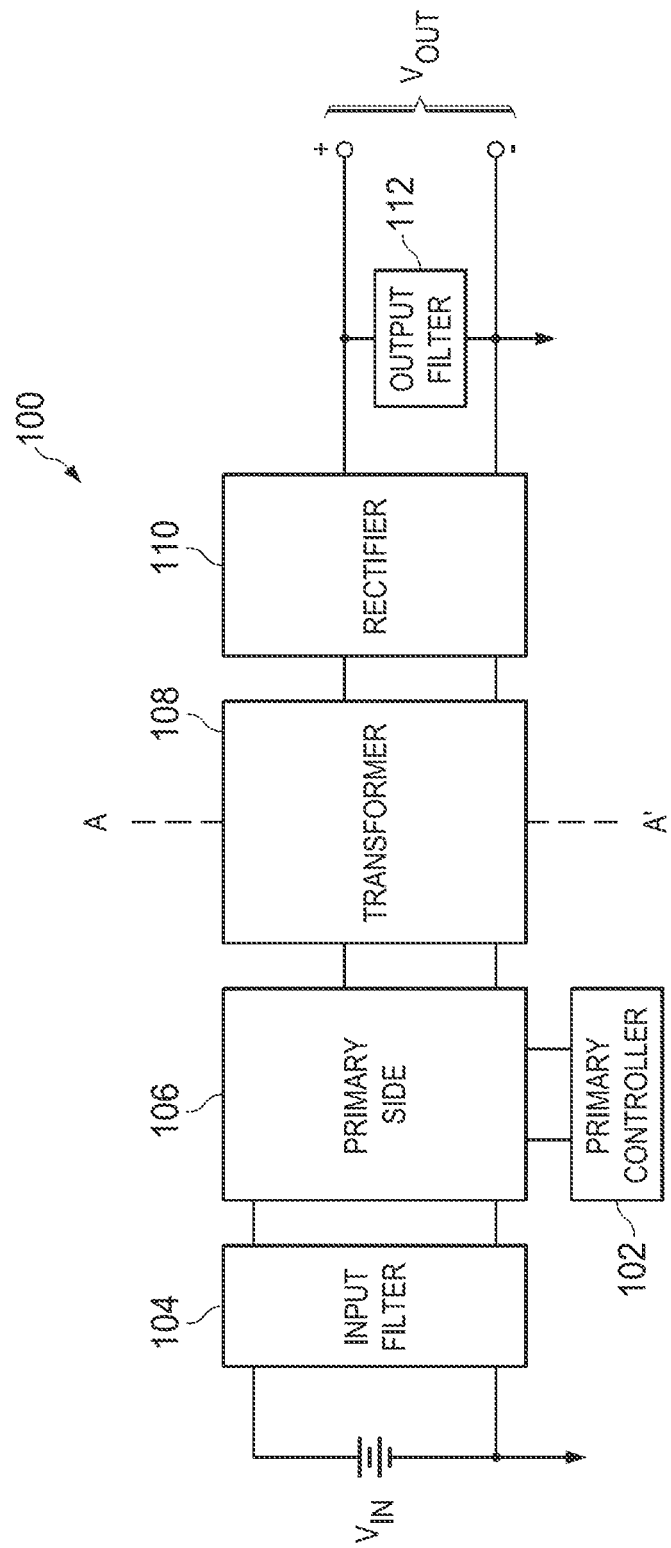
FIG. 1 illustrates a block diagram of an isolated dc/dc converter having a primary side pulse width modulation controller in accordance with an embodiment.

Referring initially to FIG. 1, a block diagram of an isolated dc/dc converter having a primary side pulse width modulation controller is illustrated in accordance with an embodiment. The isolated dc/dc converter 100 comprises an input filter 104, a primary side network 106, a transformer 108, a rectifier 110 and an output filter 112. In addition, the primary side pulse width modulation controller 102 is placed at the primary side of the isolated dc/dc converter 100. It should be noted that as indicated by a dashed line A-A', the left side of the dashed line including the input dc source VIN, the input filter 104 and the primary side network 106 is commonly referred to as the primary side of the isolated dc/dc converter 100. On the other hand, the right side of the dashed line A-A' including the rectifier 110 and the output filter 112 is commonly referred to as the secondary side of the isolated dc/dc converter 100. Furthermore, as shown in FIG. 1, the transformer 108 is placed between the primary side and the secondary side. In fact, the transformer 108 provides electrical isolation between the primary side and the secondary side of the isolated dc/dc converter 100.

The primary side network 106 is coupled to the input dc source VIN through the input filter 104. Depending on different power converter topologies, the primary side network 106 may comprise different combinations of switches as well as passive components. For example, the primary side network 106 may comprise four switching elements connected in a bridge configuration when the isolated dc/dc converter 100 is a full bridge power converter. On the other hand, when the isolated dc/dc converter 100 is an LLC resonant converter, the primary side network 106 may comprise a high side switching element and a low side switching element connected in series, and a resonant tank formed by an inductor and a capacitor connected in series.

Furthermore, when the isolated dc/dc converter 100 may be an active clamp forward converter, the primary side network 106 may comprise a primary switch and an active clamp reset device formed by an auxiliary switch and a clamp capacitor. The detailed operation of active clamp forward converters will be discussed below with respect to FIG. 2. One of ordinary of skill in the art will realize that the isolated dc/dc converter 100 as well as its corresponding primary side network 106 may be implemented in many different ways. It should be noted that the power converter topologies discussed herein are provided for illustrative purposes only, and are provided only as examples of various embodiments.

The input filter 104 may comprise an inductor coupled between the input dc source VIN and the primary side network 106. The input filter 104 may further comprise a plurality of input capacitors. The inductor provides high impedance when switching noise tries to flow out of the primary side network 106. At the same time, the input capacitors shunt the input of the isolated dc/dc converter 100 and provide a low impedance channel for the switching noise generated from the primary side network 106. As a result, the switching noise of the isolated dc/dc converter 100 may be prevented from passing through the input filter 104. The structure and operation of the input filter of an isolated dc/dc converter are well known in the art, and hence are not discussed in further detail.

The transformer 108 provides electrical isolation between the primary side and the secondary side of the isolated dc/dc converter 100. In accordance with an embodiment, the transformer 108 may be formed of two transformer windings, namely a primary transformer winding and a secondary transformer winding. Alternatively, the transformer 108 may have a center tapped secondary so as to have three transformer windings including a primary transformer winding, a first secondary transformer winding and a second secondary transformer winding. It should be noted that the transformers illustrated herein and throughout the description are merely examples, which should not unduly limit the scope of the claims. One of ordinary skill in the art would recognize many variations, alternatives, and modifications. For example, the transformer 108 may further comprise a variety of bias windings and gate drive auxiliary windings.

The rectifier 110 converts an alternating polarity waveform received from the output of the transformer 108 to a single polarity waveform. The rectifier 110 may be formed of a pair of switching elements such as NMOS transistors. Alternatively, the rectifier 110 may be formed of a pair of diodes. Furthermore, the rectifier 110 may be formed by other types of controllable devices such as metal oxide semiconductor field effect transistor (MOSFET) devices, bipolar junction transistor (BJT) devices, super junction transistor (SJT) devices, insulated gate bipolar transistor (IGBT) devices and the like. The detailed operation and structure of the rectifier 110 are well known in the art, and hence are not discussed herein.

The output filter 112 is used to attenuate the switching ripple of the isolated dc/dc converter 100. According to the operation principles of isolated dc/dc converters, the output filter 112 may be an L-C filter formed by an inductor and a plurality of capacitors. One person skilled in the art will recognize that some isolated dc/dc converter topologies such as forward converters may require an L-C filter. On the other hand, some isolated dc/dc converter topologies such as LLC resonant converters may include an output filter formed by a capacitor. One person skilled in the art will further recognize that different output filter configurations apply to different power converter topologies as appropriate. The configuration variations of the output filter 112 are within various embodiments of the present disclosure.

FIG. 1 further comprises a primary pulse width modulation (PWM) controller 102. The primary PWM controller 102 may generate gate drive signals for the primary side switching network 106. In accordance with an embodiment, the primary PWM controller 102 may employ a peak current mode control mechanism to generate the gate drive signals based upon the comparison between a detected output voltage and a sensed current signal. Alternatively, the primary PWM controller 102 may employ a voltage mode control mechanism to generate the gate drive signals based upon the detected output voltage. However, as one having ordinary skill in the art will recognize, the control mechanisms described above are merely exemplary methods and are not meant to limit the current embodiments. Other control mechanisms, such as average current mode control scheme may alternatively be used. Any suitable control mechanisms may be used, and all such control mechanisms are fully intended to be included within the scope of the embodiments discussed herein.

Figure 2:
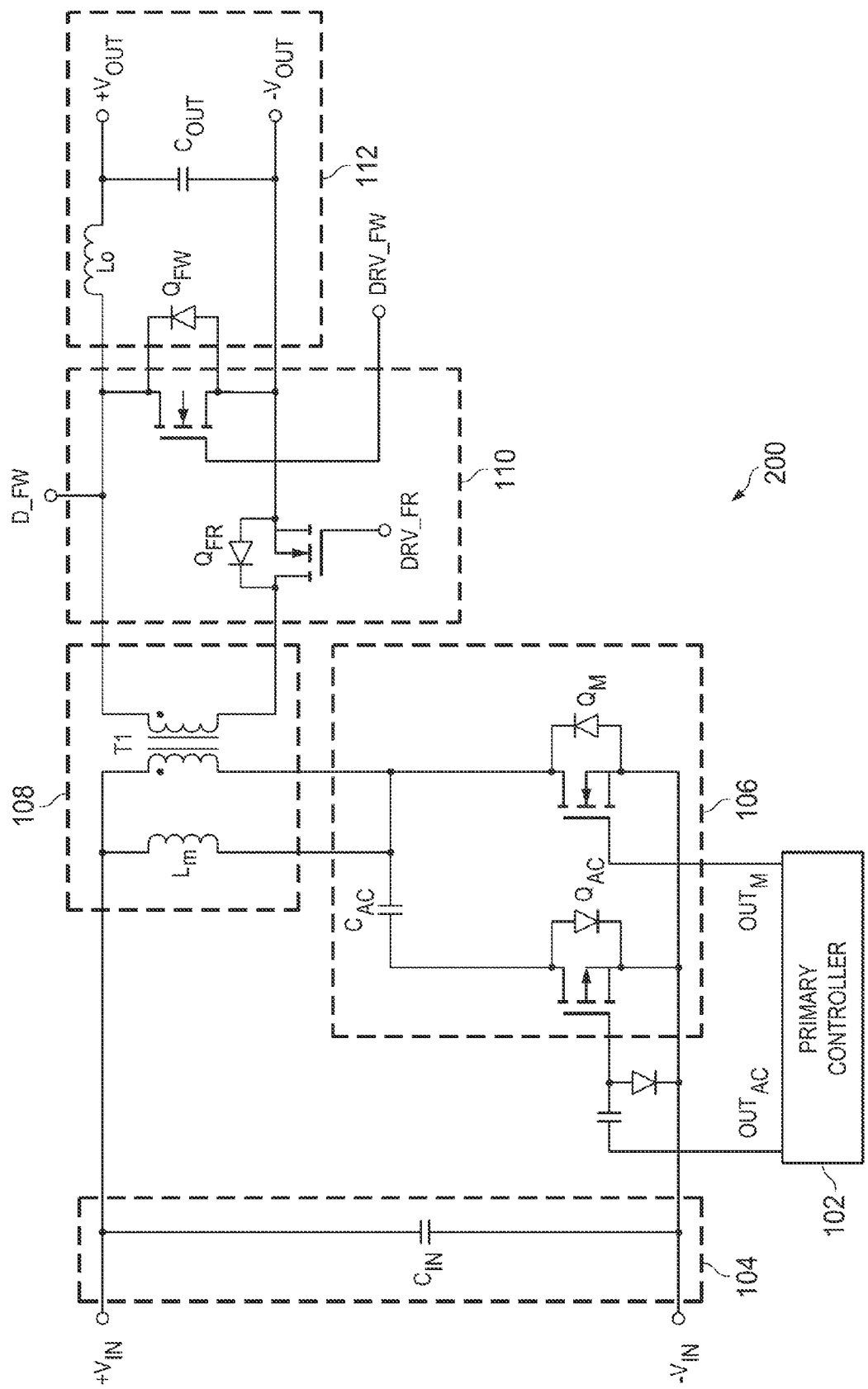
FIG. 2 illustrates a schematic diagram of an active clamp forward converter in accordance with an embodiment.

FIG. 2 illustrates a schematic diagram of an active clamp forward converter 200 in accordance with an embodiment. An input voltage source VIN is coupled to a primary switch $Q_M$ through the primary winding of the transformer 108. For simplicity, throughout the description, the transformer 108 is alternatively referred to as transformer T1. The primary switch $Q_M$ is connected in parallel with an active clamp reset device formed by an auxiliary switch $Q_{AC}$ and a clamp capacitor $C_{AC}$ connected in series. In accordance with an embodiment, the primary switch $Q_M$ is an n-type MOSFET device. The auxiliary switch $Q_{AC}$ is a p-type MOSFET device. The clamp capacitor $C_{AC}$ is a 0.1 uF ceramic capacitor.

The primary PWM controller 102 may generate two gate drive signals $OUT_M$ and $OUT_{AC}$ for the primary switch $Q_M$ and the auxiliary switch $Q_{AC}$ respectively. According to the operating principles of an active clamp forward converter, the amount of time D·T that the primary switch $Q_M$ conducts current during a switching period T is determined by a duty cycle D. The duty cycle D may have a value from 0 to 1. On the other hand, the amount of time that the auxiliary switch $Q_{AC}$ conducts current is approximately equal to (1−D)·T. The detailed gate drive waveforms of the primary switch $Q_M$ and the auxiliary switch $Q_{AC}$ will be discussed below with respect to FIG. 3.

In accordance with an embodiment, the secondary rectifier 110 is formed by a forward switch $Q_{FR}$ and a freewheeling switch $Q_{FW}$. Both the forward switch $Q_{FR}$ and the freewheeling switch $Q_{FW}$ may be an n-type MOSFET device. It should be noted that the synchronous rectifier may be formed by other switching elements such as BJT devices, SJT devices, IGBT devices and the like. It should further be noted that while FIG. 2 illustrates a single switching element for either the forward switch $Q_{FR}$ or the freewheeling switch $Q_{FW}$, one of ordinary skill in the art would recognize many variations, alternatives, and modifications. For example, the forward switch $Q_{FR}$ may comprise a plurality of MOSFET devices connected in parallel.

As shown in FIG. 2, both the sources of the forward switch $Q_{FR}$ and the freewheeling switch $Q_{FW}$ are coupled together and further coupled to the negative terminal of the secondary output. The forward switch $Q_{FR}$ and the freewheeling switch $Q_{FW}$ are driven by gate drive signals DRV_FR and DRV_FW respectively, which are generated by a secondary side gate drive controller (not shown).

According to the operation principles of an active clamp forward converter, when the input voltage source VIN is applied to the primary side winding of the transformer T1 through the turn-on of the primary switch $Q_M$, the polarity of the secondary side winding of the transformer T1 is so configured that the secondary side positive output is coupled to the secondary side of the transformer T1 through the output inductor $L_O$ and the turned-on forward switch $Q_{FR}$. On the other hand, when the primary side switch $Q_M$ is turned off, the secondary output is maintained by a freewheeling current path formed by the output inductor Lo and the turned on freewheeling switch $Q_{FW}$. The detailed operation of the secondary side gate driver is well known in the art, and hence is not discussed in further detail herein.

Figure 3:
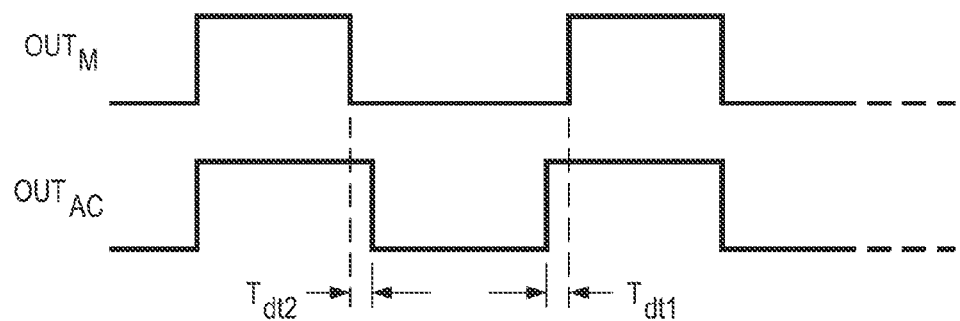
FIG. 3 illustrates a gate drive timing diagram of an active clamp forward converter in accordance with an embodiment.

FIG. 3 illustrates a gate drive timing diagram of an active clamp forward converter in accordance with an embodiment. As shown in FIG. 3, there may be two dead time periods between the primary gate drive $OUT_M$ and the auxiliary gate drive $OUT_{AC}$. It should be noted that the auxiliary switch $Q_{AC}$ in an active clamp forward converter shown in FIG. 2 is a p-type MOSFET. Therefore, the logic high state at $OUT_{AC}$ actually means a turn-off of the auxiliary switch $Q_{AC}$. As such, the first dead time $T_{dt1}$ is the timing gap between the leading edge of $OUT_{AC}$ and the leading edge of $OUT_M$. Because $Q_{AC}$ is a p-type MOSFET, the first dead time $T_{dt1}$ is the dead time between the turn-off of the auxiliary switch $Q_{AC}$ and the turn-on of the main switch $Q_M$. Likewise, the second dead time $T_{dt2}$ is between the trailing edges of $OUT_M$ and $OUT_{AC}$. In other words, the second dead time $T_{dt2}$ is the dead time between the turn-off of the main switch $Q_M$ and the turn-on of the auxiliary switch $Q_{AC}$.

In accordance with an embodiment, $T_{dt2}$ may be a fixed dead time such as 50 ns. In order to achieve zero voltage switching (ZVS) operation of the primary switch $Q_M$, $T_{dt1}$ may be an adjustable dead time. According to the operation principles of active clamp forward converters, during the first dead time period, the voltage across the drain and source of the primary switch $Q_M$ may be discharged by the leakage and magnetizing energy. However, when the isolated dc/dc converter 200 (not shown but illustrated in FIG. 2) enters a light load condition, the leakage energy may decrease proportionally. As such, the ZVS process cannot be achieved within a dead time period designed for a full load leakage current. In accordance with an embodiment, the first dead time $T_{dt1}$ may increase accordingly in a light load condition so that the isolated dc/dc converter 200 can achieve a ZVS turn-on of the primary switch $Q_M$. The detailed operation of adjusting $T_{dt1}$ will be described below with respect to FIGS. 4-6.

Figure 4A:
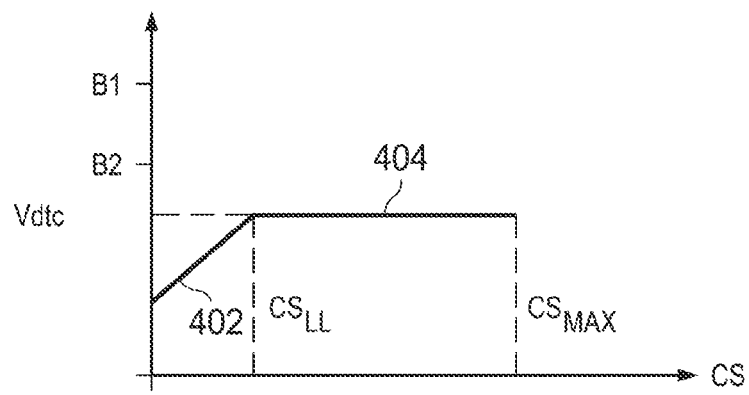
FIG. 4A is a graph illustrating a two-piecewise linear approximation of $V_{dtc}$ versus the current sense voltage on the current sense pin of the primary side pulse width modulation controller.

FIG. 4A is a graph illustrating a two-piecewise linear approximation of $V_{dtc}$ versus the current sense voltage on the current sense pin of the primary side PWM controller (not shown). $V_{dtc}$ is an intermediate stage for generating the dead time $T_{dt1}$ between the turn-on of the primary switch $Q_M$ and the turn-off of the auxiliary switch $Q_{AC}$. The implement of $V_{dtc}$ will be described in detail below with respect to FIG. 5 and FIG. 6. According to FIG. 4A, $V_{dtc}$ includes two portions, namely light load portion 402 and heavy load portion 404. As shown in FIG. 4A, the light load portion 402 is a ramp proportional to the sensed current CS. Furthermore, as shown in FIG. 4A, at $C_{SLL}$, the ramp is clamped by the heavy load portion 404, which is a constant value. $C_{SLL}$ is a predetermined dividing point between the light load and the heavy load of the isolated dc/dc converter 200 (shown in FIG. 2). In accordance with an embodiment, $CS_{LL}$ is in a range from 20% to 30% of the full load of the isolated dc/dc converter 200.

Figure 4B:
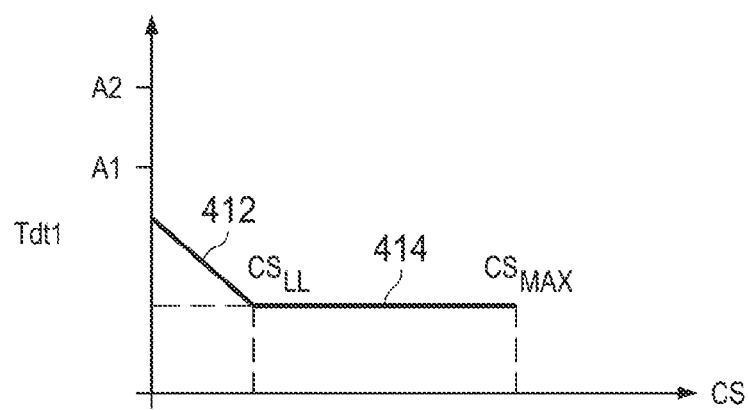
FIG. 4B is a graph illustrating a two-piecewise linear approximation of $T_{dt1}$ versus the current sense voltage on the current sense pin of the primary side pulse width modulation controller.

FIG. 4B is a graph illustrating a two-piecewise linear approximation of $T_{dt1}$ versus the current sense voltage on the current sense pin of the primary side PWM controller. In comparison between FIG. 4A and FIG. 4B, $T_{dt1}$ is inversely proportional to $V_{dtc}$. More particularly, the light load dead time 412 is inversely proportional to the light load portion 402 of FIG. 4A. Likewise, the heavy load dead time 414 and the heavy load portion 404 of FIG. 4A have a reciprocal relationship. In fact, in accordance with an embodiment, $T_{dt1}$ is approximately equal to one over $V_{dtc}$. Alternatively, in order to change the amplitude of $T_{dt1}$, a coefficient K can be added into the relationship between $T_{dt1}$ and $V_{dtc}$. As a result, $T_{dt1}$ may be approximately equal to K over $V_{dtc}$. The detailed implementation of FIG. 4A and FIG. 4B in a primary side PWM controller will be illustrated in FIG. 5 and FIG. 6.

Figure 5:
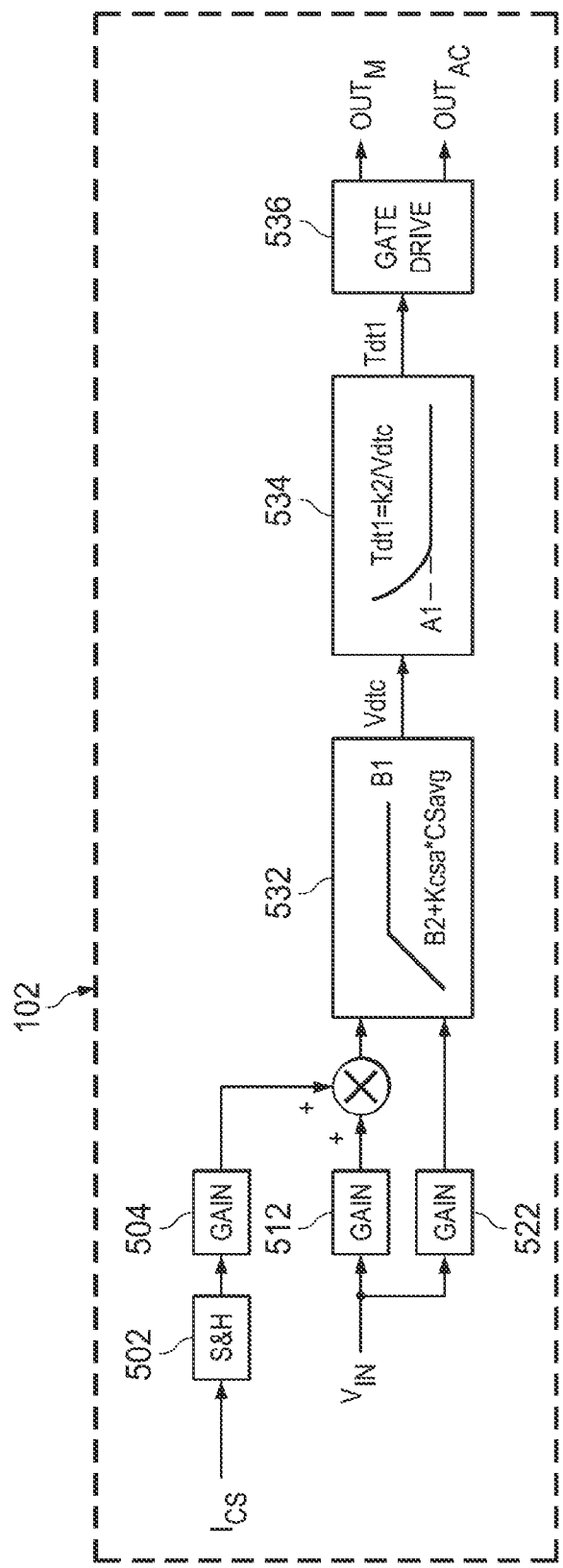
FIG. 5 is a block diagram of an adaptive dead time control scheme of an active clamp forward converter in accordance with an embodiment.

FIG. 5 is a block diagram of an adaptive dead time control scheme of an active clamp forward converter in accordance with an embodiment. It should be noted that for simplicity, FIG. 5 only illustrates a portion of a primary side PWM controller. A person skilled in the art will recognize that a primary side PWM controller may include other sections such as various protection units and the like. $I_{CS}$ is a current sense signal, which is generated by an internal current sense device. Alternatively, $I_{CS}$ may be a current sense pin, which receives a sensed current from an external current device such as a current sense transformer. Likewise, VIN may be an input output (I/O) pin directly coupled to the input of the isolated dc/dc converter 200 (shown in FIG. 2). Alternatively, VIN may be tied to an under-voltage protection signal, which is scaled down from the input voltage VIN by a resistor divider (not shown).

As shown in FIG. 5, $I_{CS}$ is detected by a sample and hold device 502, which converts the sensed current into a dc voltage. A first gain stage 504 is added to adjust the amplitude of the sensed current. On the other hand, the input voltage VIN is modified by a second gain stage 512. The output of the second gain stage 512 and the output of the first gain stage 504 are added together to form the light load portion of a $V_{dtc}$ generator 532. The heavy load portion of $V_{dtc}$ is formed by the input voltage VIN modified by a third gain stage 522. As described above with respect to FIG. 4, the light load portion of the $V_{dtc}$ generator 532 is clamped by the heavy load portion of the $V_{dtc}$ generator 532.

Furthermore, the output of the $V_{dtc}$ generator 532 is sent to a $T_{dt1}$ generator 534. The $T_{dt1}$ generator 534 generates a dead time $T_{dt1}$ inversely proportional to $V_{dtc}$. Such a dead time $T_{dt1}$ is used to generate the dead time between the turn-on of the primary switch $Q_M$ and the auxiliary switch $Q_{AC}$ in a gate drive unit 536. An advantageous feature of having an adjustable dead time under a light load condition is that the isolated dc/dc converter can achieve a ZVS turn-on of the primary switch $Q_M$. As a result, the switching losses of the isolated dc/dc converter can be reduced.

Figure 6:
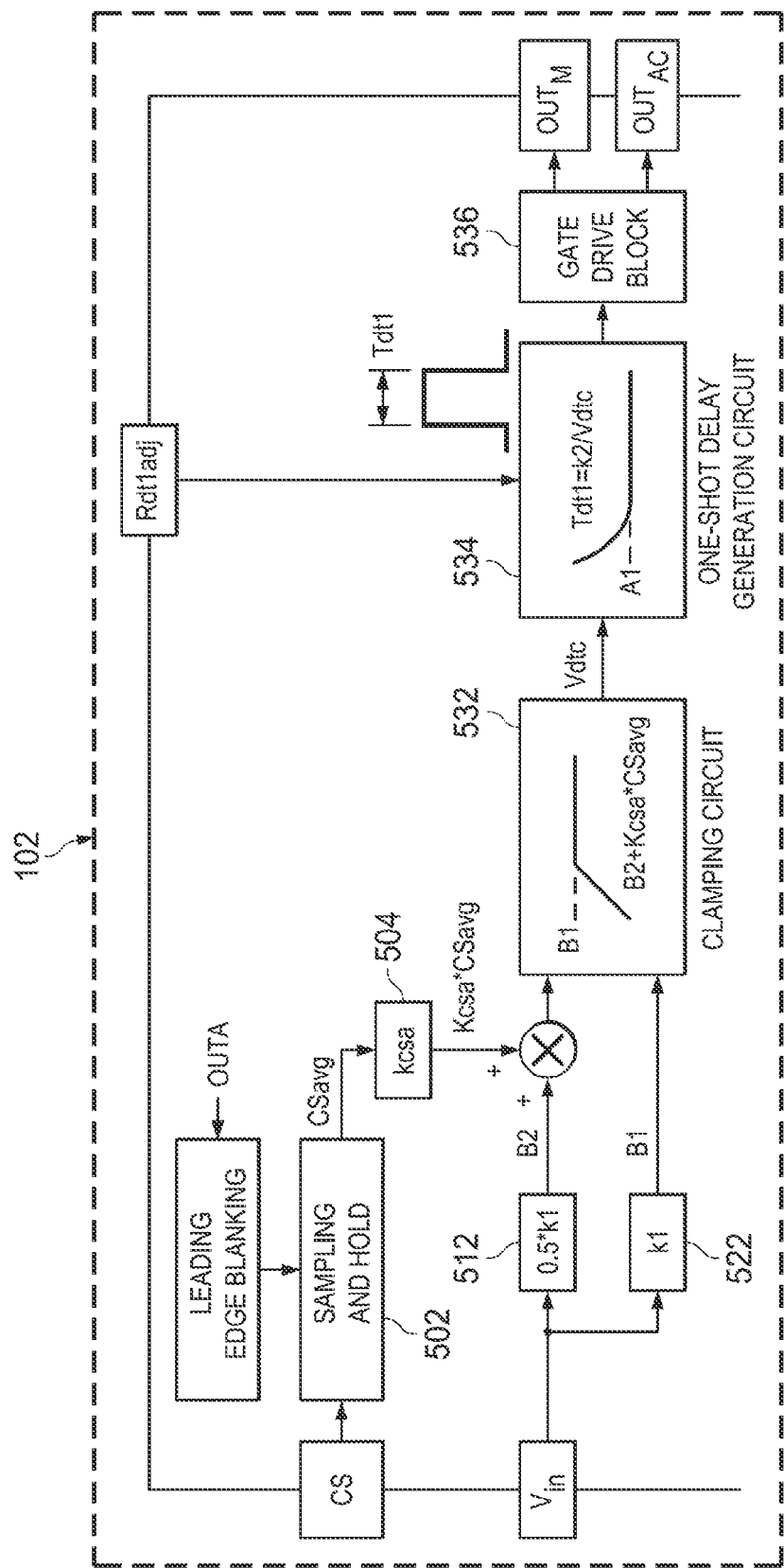
FIG. 6 is a block diagram of an integrated adaptive dead-time control implementation.

FIG. 6 is a block diagram of an integrated adaptive dead-time control implementation. In an embodiment implementation of an adaptive dead-time control in a primary side PWM controller, the primary current sense voltage CS is used to generate the average current sense voltage $CS_{avg}$ through a sample and hold device 502. A first gain stage 504 provides an adjustable gain by adjusting $K_{csa}$. As shown in FIG. 6, the output of the first gain stage 504 is equal to the product of $CS_{avg}$ and $K_{csa}$. It should be noted that there are many ways to obtain $CS_{avg}$. The various implementations of $CS_{avg}$ are within the scope of the present invention. It should further be noted that the current information is not limited to an average current value. Alternatively, the current information may be, for example, a peak current value or a valley current value.

The sensed input voltage VIN may come from the VIN pin of a primary side PWM controller directly. Alternatively, the sensed input voltage VIN may be a scaled down voltage using an internal voltage divider with a fixed ratio. Furthermore, the sensed voltage may come from the under voltage lockout (UVLO) pin of the primary side PWM controller. As shown in FIG. 6, the sensed input voltage VIN is sent to a second gain stage 512 and a third gain stage 522 respectively. In accordance with an embodiment, the second gain stage 512 has a gain equal to 0.5·K1 and the third gain stage 522 has a gain equal to K1. The outputs of the first second gain stage and the third gain stage are referred to as B2 and B1 respectively.

The sensed current CS is combined with the sensed input voltage VIN to control the dead-time $T_{dt1}$ through an arithmetic addition process shown in FIG. 6. It should be noted while FIG. 6 illustrates an arithmetic addition process is employed, the method to combine the sensed current and the sensed input voltage is not limited to the arithmetic addition process. Instead, it may be, for example, a subtraction process or a multiplication process. Coefficients K1, $K_{csa}$, and the ratio of B1 to B2 may be substantially fixed inside the primary side PWM controller depending on different applications. If the input voltage sense comes from the UVLO voltage, and the UVLO voltage is directly proportional to the input voltage VIN, then the information for coefficient K1 is already included in UVLO voltage, and therefore it may not need to be incorporated in the primary side PWM controller.

For a given input voltage, $T_{dt1}$ generally is intended to be maintained substantially constant from a medium load current to a heavy load current. When the load current decreases to a level below a predetermined dividing point and the isolated dc/dc converter enters a light load condition, the dead time $T_{dt1}$ increases so as to achieve ZVS operation of the primary switch $Q_M$ (shown in FIG. 2). The selection of coefficients K1, $K_{csa}$, and the ratio of B1 to B2, sets the shape of the curve shown in the $V_{dtc}$ generator 532.

In the $V_{dtc}$ generator 532 shown in FIG. 6, the ramp B2 is clamped by a constant voltage level B1. The output signal of the $V_{dtc}$ generator 532 is referred to as $V_{dtc}$, which is an intermediate voltage signal for generating the adaptive dead time $T_{dt1}$. Furthermore, the $V_{dtc}$ generator 532 sends the output voltage $V_{dtc}$ to a $T_{dt1}$ generator 534, in which an adaptive dead time $T_{dt1}$ is generated based upon $V_{dtc}$. More particularly, when the sensed current CS is low, the adaptive dead time $T_{dt1}$ is longer. On the other hand, when the sensed current is high, the dead time $T_{dt1}$ is relatively shorter.

As shown in FIG. 6, at light load, there may be a reciprocal relationship between $V_{dtc}$ and the adaptive dead time $T_{dt1}$. In addition, to accommodate different designs, a resistor externally connected from the $R_{dt1adj}$ pin (not shown) to ground may be used to adjust the overall amplitude of the dead time vs. load current and line voltage curves. It should be noted that the external resistor $R_{dt1adj}$ does not change the shape of the dead time curve $T_{dt1}$. Instead, by employing different external resistor $R_{dt1adj}$ values, the dead time $T_{dt1}$ can be adjusted accordingly. It should be noted that FIG. 6 only illustrates a block diagram of generating an adaptive dead time. There may be a variety of ways to implement each block shown in FIG. 6. The detailed implementation is well known in the art, and hence is not discussed in further detail herein.

Although embodiments of the present invention and its advantages have been described in detail, it should be understood that various changes, substitutions and alterations can be made herein without departing from the spirit and scope of the invention as defined by the appended claims.

Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed, that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. An apparatus comprising:
   a first two-piecewise linear approximation generator comprising:
      a light load ramp generator having an input receiving a sensed current signal; and
      a clamping voltage generator, wherein a ramp generated by the light load ramp generator is clamped by a clamping voltage generated by the clamping voltage generator and the ramp is generated based upon the sensed current signal;
   a second two-piecewise linear approximation generator coupled to an output of the first two-piecewise linear approximation generator, wherein the second two-piecewise linear approximation generator generates a dead time inversely proportional to the output of the first two-piecewise linear approximation generator; and
   a gate drive generator configured to generate a primary switch drive signal and an auxiliary switch drive signal complementary to the primary switch drive signal, wherein the dead time is placed between the primary switch drive signal and the auxiliary switch drive signal.

2. The apparatus of claim 1, wherein the first two-piecewise linear approximation generator comprises a plurality of coefficients for adjusting the ramp and the clamping voltage.

3. The apparatus of claim 1, wherein the gate drive generator is configured to generate a primary switch drive signal and an auxiliary switch drive signal for an active clamp forward converter.

4. The apparatus of claim 1, wherein the first two-piecewise linear approximation generator comprises:
   a sample and hold unit receiving the sensed current signal;
   a first gain stage having an input coupled to an output of the sample and hold unit and an output coupled to a first input of an adder; and
   a second gain stage having an input coupled to a sensed input voltage and an output coupled to a second input of the adder.

5. The apparatus of claim 4, further comprising a third gain stage having an input coupled to the sensed input voltage and an output coupled to an output of the adder.

6. The apparatus of claim 1, wherein the dead time comprises:
   a first dead time between a turn-on of a primary switch and a turn-off of an auxiliary switch; and
   a second dead time between a turn-on of the auxiliary switch and a turn-off of the primary switch.

7. The apparatus of claim 6, wherein the gate drive generator is configured such that:
   the first dead time is adjustable based upon a loading condition; and
   the second dead time is fixed.

8. A system comprising:
   a primary switching circuit comprising a main switch and an auxiliary switch, wherein a main switch gate drive signal is complementary to an auxiliary switch gate drive signal; and
   a primary side pulse width modulation controller comprising:
      a current sense unit;
      an input voltage sense unit;
      a first two-piecewise linear approximation generator having a first input coupled to the current sense unit and a second input coupled to the input voltage sense unit, wherein first two-piecewise linear approximation generator generates a ramp based upon a sensed current signal from the current sense unit;
      a second two-piecewise linear approximation generator coupled to an output of the first two-piecewise linear approximation generator, wherein the second two-piecewise linear approximation generator generates a dead time inversely proportional to the output of the first two-piecewise linear approximation generator; and
      a gate drive generator configured to generate the main switch gate drive signal and the auxiliary switch gate drive signal, wherein the dead time is placed between the main switch gate drive signal and the auxiliary switch gate drive signal.

9. The system of claim 8, wherein the first two-piecewise linear approximation generator comprises:
   a light load ramp generator; and
   a clamping voltage generator, wherein a ramp generated by the light load ramp generator is clamped by a clamping voltage generated by the clamping voltage generator.

10. The system of claim 8, wherein the primary side pulse width modulation controller is configured such that:
    the dead time is a constant value when a power converter operates in a heavy load condition; and
    the dead time is inversely proportional to a load current value when the power converter operates in a light load condition.

11. The system of claim 10, wherein the light load condition or the heavy load condition is indicated by a dividing point.

12. The system of claim 11, wherein the dividing point is between 20% and 30% of a full load current of the power converter.

13. The system of claim 8, further comprising a reset capacitor connected in series with the auxiliary switch.

14. The system of claim 8, wherein the dead time comprises:
    an adjustable first dead time between a turn-on of the main switch and a turn-off of the auxiliary switch; and
    a fixed second dead time between a turn-on of the auxiliary switch and a turn-off of the main switch.

15. A method comprising:
    detecting a load current of a power converter;
    detecting an input voltage of the power converter;
    generating a first voltage signal including a ramp voltage based upon the detected load current and the input voltage using a first two-piecewise linear approximation curve;
    generating a second voltage signal based upon the first voltage signal using a second two-piecewise linear approximation curve, wherein the second voltage signal is inversely proportional to the first voltage signal; and generating a dead time between a primary switch of the power converter and auxiliary switch of the power converter using the second voltage signal.

16. The method of claim 15, further comprising:
receiving a sensed load current through a sample and hold device; and
adjusting an amplitude of the sensed load current through a first gain stage.

17. The method of claim 16, further comprising:
receiving a sensed input voltage;
adjusting an amplitude of the sensed input voltage through a second gain stage; and
adding an output of the first gain stage and an output of the second gain stage using an adder.

18. The method of claim 17, further comprising:
clamping an output of the adder using a voltage proportional to the sensed input voltage.

19. The method of claim 15, further comprising:
generating an adjustable first dead time between a turn-on of the primary switch and a turn-off of the auxiliary switch; and
generating a fixed second dead time between a turn-on of the auxiliary switch and a turn-off of the primary switch.

20. The method of claim 15, further comprising:
configuring a primary pulse width modulation controller such that:
the dead time is a constant value when the power converter operates in a heavy load condition; and
the dead time is inversely proportional to a load current value when the power converter operates in a light load condition.

* * * * *